United States Patent
Park et al.

(10) Patent No.: US 10,632,739 B2
(45) Date of Patent: Apr. 28, 2020

(54) ROLLER MODULE WITH MAGNETIC BEARINGS AND PERMANENT MAGNETS

(71) Applicant: KOREA INSTITUTE OF MACHINERY & MATERIALS, Daejeon (KR)

(72) Inventors: Cheol-Hoon Park, Daejeon (KR); Taik-Min Lee, Daejeon (KR); Dong-Woo Kang, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 122 days.

(21) Appl. No.: 15/554,729

(22) PCT Filed: Apr. 7, 2016

(86) PCT No.: PCT/KR2016/003652
§ 371 (c)(1),
(2) Date: Aug. 31, 2017

(87) PCT Pub. No.: WO2017/039105
PCT Pub. Date: Mar. 9, 2017

(65) Prior Publication Data
US 2018/0050533 A1    Feb. 22, 2018

(30) Foreign Application Priority Data
Sep. 3, 2015 (KR) .......... 10-2015-0124648

(51) Int. Cl.
*B41F 31/30* (2006.01)
*F16C 13/02* (2006.01)
(Continued)

(52) U.S. Cl.
CPC .......... *B41F 31/304* (2013.01); *B41F 13/085* (2013.01); *B41F 13/20* (2013.01);
(Continued)

(58) Field of Classification Search
CPC ...................................................... B41F 31/38
See application file for complete search history.

(56) References Cited

U.S. PATENT DOCUMENTS

| 9,273,723 B2 * | 3/2016 | Park .................... F16C 32/0465 |
| 2008/0073993 A1 | 3/2008 | Sortore et al. |

(Continued)

FOREIGN PATENT DOCUMENTS

| KR | 1019950033144 A | 12/1995 |
| KR | 1020090060223 A | 6/2009 |

(Continued)

OTHER PUBLICATIONS

Machine Translation of KR-20120044825-A (Year: 2011).*
(Continued)

*Primary Examiner* — Jacob J Cigna
(74) *Attorney, Agent, or Firm* — Hauptman Ham, LLP

(57) ABSTRACT

A roller module includes a roller, a magnetic bearing, a permanent magnet, at least one pair of magnetic coring, and a plurality of gap sensors. The roller has a protrusion and has a cylindrical shape. The protrusion is formed at both outer surfaces of the roller with a stepped portion and has the cylindrical shape. The magnetic bearing is formed at the roller. The permanent magnet is formed at the roller. At least one pair of magnetic coring covers an outer circumference of the protrusion. The gap sensors are formed along an axial direction and a radial direction of the roller.

9 Claims, 11 Drawing Sheets

(51) Int. Cl.
  *B41F 13/08* (2006.01)
  *B41F 13/20* (2006.01)
  *F16C 32/04* (2006.01)

(52) U.S. Cl.
  CPC .......... *F16C 13/02* (2013.01); *F16C 32/0421* (2013.01); *F16C 32/0425* (2013.01); *F16C 32/0427* (2013.01); *F16C 32/0446* (2013.01); *F16C 32/0465* (2013.01); *F16C 2324/16* (2013.01)

(56) References Cited

U.S. PATENT DOCUMENTS

2010/0254648 A1  10/2010  Yoshikawa et al.
2011/0074231 A1*  3/2011  Soderberg ................ H01F 3/10
                                                    310/44
2012/0091832 A1*  4/2012  Soderberg ................ C08J 3/00
                                                    310/44

FOREIGN PATENT DOCUMENTS

| KR | 20110058357 A | | 6/2011 | |
| KR | 20110102712 A | * | 9/2011 | .......... F16C 32/0417 |
| KR | 20110102712 A | | 9/2011 | |
| KR | 20120044825 A | * | 5/2012 | |
| KR | 101343876 B1 | | 12/2013 | |
| WO | WO-2013191422 A1 | * | 12/2013 | .......... F16C 32/0465 |

OTHER PUBLICATIONS

Machine Translation of KR-20110102712-A (Year: 2012).*
International Search Report for PCT/KR2016/003652, dated May 12, 2016, 4 pages.

* cited by examiner

ROLLER MODULE WITH MAGNETIC BEARINGS AND PERMANENT MAGNETS

CROSS-REFERENCE TO RELATED APPLICATIONS

This application is a U.S. National Phase of International Application Number PCT/KR2016/003652, filed on Apr. 7, 2016, and claims priority under 35 U.S.C. § 119 to Korean Patent Application No. 10-2015-0124648, filed on Sep. 3, 2015 in the Korean Intellectual Property Office (KIPO)

BACKGROUND

1. Field of Disclosure

The present disclosure of invention relates to a roller module with magnetic bearings and permanent magnets, and more specifically the present disclosure of invention relates to a roller module having a radial magnetic bearing and a thrust magnetic bearing respectively along a radial direction and an axial direction, and having a permanent magnet part in addition, to support loads along the radial and axial directions and to support a self-load of a roller during no current applied, such that a shaking error of the roller may be minimized.

2. Description of Related Technology

Recently, a roll-to-roll device for manufacturing a graphene which is used for a transparent electrode in a display device, a solar cell device and so on, and a ultra-micro printed electronic roll printing device or a hot embossing device for manufacturing a touch screen device, a flexible display device and so on, have been developed.

Thus, in the printed electronic roll printing device, the nano imprinting device and the hot embossing device which are applied for a high-integrated circuit device, a smart sensor and so on used for IoT, a roller should be used to increase printing accuracy and printing precision.

However, the roller applied to the conventional device is normally supported by a mechanical rolling bearing such as a ball bearing or a roller bearing.

For example, as disclosed in Korean laid-open patent application No. 10-2009-0060223, in a roller bearing 11 having an inner wheel and an outer wheel connected with each other through wings, and a plurality of cylindrical rollers disposed between the inner and outer wheels and as an electric driving body, a length of a surface facing an orbital plane of the cylindrical roller of the inner and outer wheels and along a width direction is larger than a length of the cylindrical roller along an axial direction, so that the inner and the outer wheels and may move along the axial direction to shake the roller 10. Here, as the roller 10 moves along the axial direction, the inner wheel, the outer wheel and the cylindrical roller move along the axial direction to shake the roller having the roller bearing 11.

In the above-mentioned prior art, rigidity may change as the position of an inner rolling element of the rolling bearing, and a mechanical shaking in itself exists, so that an accuracy or a precision of the roller may be limited. In addition, a relatively high driving power of a driving motor is necessary to drive the roller with overcoming a friction force between the roller and the rolling bearing.

Further, a relatively high pre-pressure of the rolling bearing is necessary to minimize the mechanical shaking of the rolling bearing, and thus the mechanical friction between the roller and the rolling bearing may be increased more to increase more powerful driving motor. Thus, the size or the power of the driving motor should be increased.

PRIOR ART

Patent Document

Korean laid-open patent application No. 10-2009-0060223 (2009 Jun. 11)

SUMMARY

The present invention is developed to solve the above-mentioned problems of the related arts. The present invention provides a roller module having a radial magnetic bearing and a thrust magnetic bearing respectively along a radial direction and an axial direction, and having a permanent magnet part in addition, to support loads along the radial and axial directions and to support a self-load of a roller during no current applied, such that a shaking error of the roller may be minimized.

According to an example embodiment, A roller module includes a roller, a magnetic bearing, a permanent magnet part, at least one pair of magnetic coring, and a plurality of gap sensors. The roller has a protrusion and has a cylindrical shape. The protrusion is formed at both outer surfaces of the roller with a stepped portion and has the cylindrical shape. The magnetic bearing is formed at the roller. The permanent magnet part is formed at the roller. At least one pair of magnetic coring covers an outer circumference of the protrusion. The gap sensors are formed along an axial direction and a radial direction of the roller. The magnetic bearing includes a radial magnetic bearing and a thrust magnetic bearing, the radial magnetic bearing is formed at an outer circumference of an end portion of the magnetic coring to support a radial load of the roller, and the thrust magnetic bearing is formed at an end portion of the protrusion to support an axial load of the roller. The permanent magnet part is formed at an upper portion of the magnetic coring and is disposed adjacent to the radial magnetic bearing along a horizontal direction.

In an example embodiment, the radial magnetic bearing and the thrust magnetic bearing may be a hybrid magnetic bearing including a permanent magnet and an electromagnet.

In an example embodiment, the gap sensor may include a radial sensor formed over the roller and an axial sensor formed at an end portion of the roller.

In an example embodiment, the permanent magnet part may include a first conductor, a single or a plurality of second conductors and a single or a plurality of permanent magnets. The first conductor may be spaced apart from the outer circumference of the magnetic coring in parallel and may have an arc shape. The single or a plurality of second conductors may be disposed beneath the first conductor and may head for the magnetic coring. The single or a plurality of permanent magnetics may be disposed beneath the first conductor and adjacent to an inner side or an outer side of the second conductor.

In an example embodiment, same poles of the permanent magnet part may face the magnetic coring.

In an example embodiment, the permanent magnet part may include a first conductor extending along an axial direction of the magnetic coring in parallel, and at least one permanent magnet extending to the magnetic coring from both end portions of the first magnet.

In an example embodiment, the permanent magnet part may further include at least one second conductor adjacent to the permanent magnet and extending to the magnetic coring from the first conductor.

In an example embodiment, the roller module having the magnetic bearing and the permanent magnet part may further include a gap sensor amp connected to the gap sensor, a controller connected to the gap sensor amp, and a current driver providing a driving current calculated in the controller to the radial magnetic bearing and the thrust magnetic bearing.

According to the present example embodiments, the roller module having a radial magnetic bearing and a thrust magnetic bearing respectively along a radial direction and an axial direction, and having a permanent magnet part in addition, to support loads along the radial and axial directions and to support a self-load of a roller during no current applied, such that a shaking error of the roller may be minimized.

DETAILED DESCRIPTION

Figure 1:
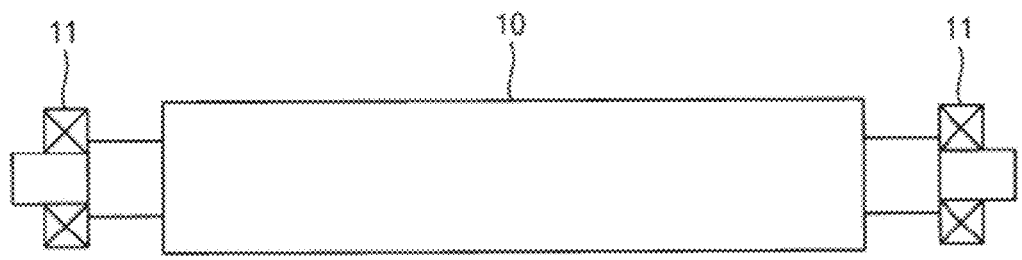
FIG. 1 is a schematic diagram illustrating an usage of a conventional cartridge heater.

The invention is described more fully hereinafter with Reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

In the drawings, the size and relative sizes of layers and regions may be exaggerated for clarity. It will be understood that, although the terms first, second, third etc. may be used herein to describe various elements, components, regions, layers and/or sections, these elements, components, regions, layers and/or sections should not be limited by these terms.

Figure 2:
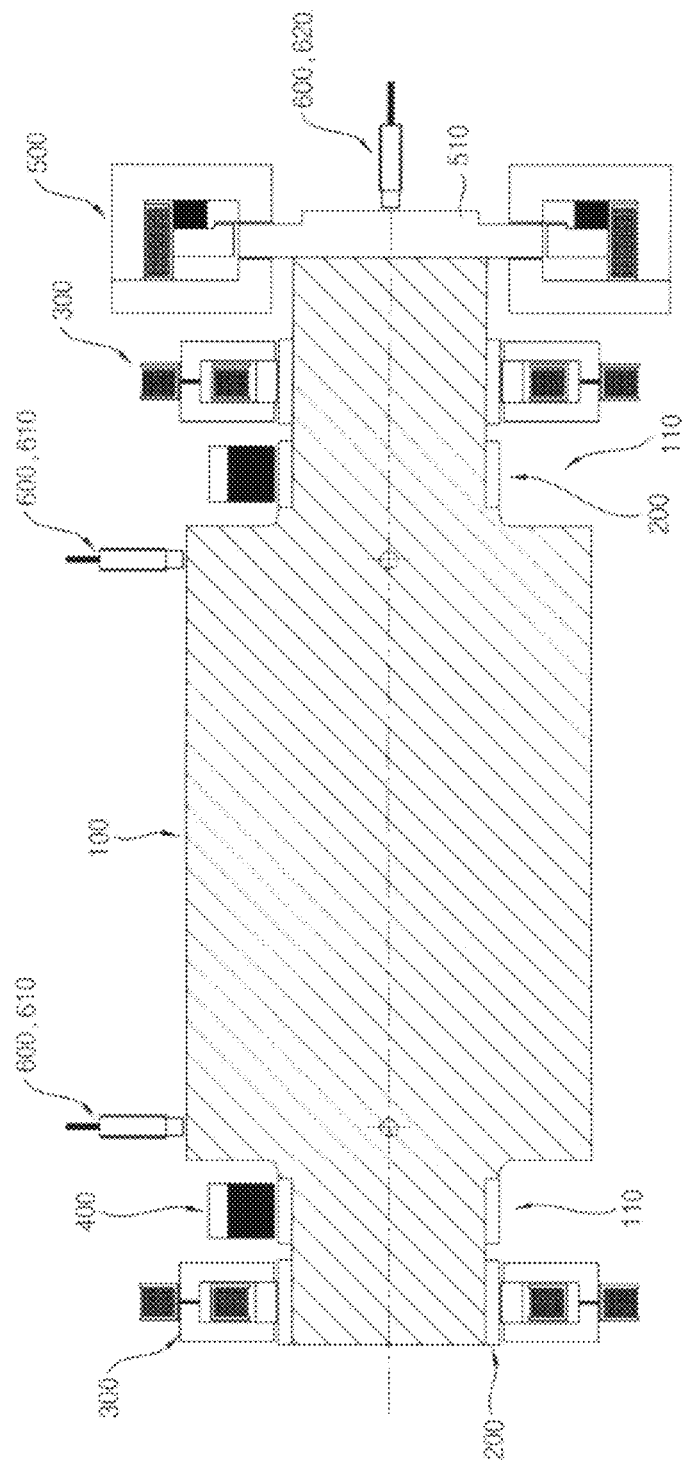
FIG. 2 is a cross-sectional view illustrating a roller module according to an example embodiment of the present invention.

FIG. 2 is a cross-sectional view illustrating a roller module according to an example embodiment of the present invention.

Referring to FIG. 2, the roller module according to the present example embodiment includes a roller 100 having a protrusion 110 and having a cylindrical shape, the protrusion being formed at both outer surfaces of the roller with a stepped portion and having the cylindrical shape; a magnetic bearing 300 and 500 formed at the roller 100; a permanent magnet part 400 formed at the roller 100; at least one pair of magnetic coring 200 covering an outer circumference of the protrusion 110; a radial magnetic bearing 300 formed at an outer circumference of an end portion of the magnetic coring 200 to support a radial load of the roller 100; a thrust magnetic bearing 500 formed at an end portion of the protrusion 110 to support an axial load of the roller 100; and a plurality of gap sensors 600 formed along an axial direction and a radial direction of the roller 100. Here, the permanent magnet part 400 is formed at an upper portion of the magnetic coring 200 and is disposed adjacent to the radial magnetic bearing 300 along a horizontal direction.

The roller 100 may be applied to all kinds of rollers included in the manufacturing equipment for printing or producing graphene, and applied to various kinds of equipment requiring high precision and quality roller. Here, mechanical shaking and friction load should be minimized in the roller 100.

The magnetic coring 200 may be formed at the outer circumference of both end portions of the roller 100 with a ring shape conductor, to form a magnetic pathway using the permanent magnet part 400 and the radial magnetic bearing 300.

In addition, the magnetic coring 200 may be combined with the outer circumference of the protrusion 110 to be stick to the outer circumference of the protrusion 110.

The permanent magnet part 400 is disposed over the magnetic coring 200 to support the self-load of the roller 100.

Here, the permanent magnet part 400 has a gap with the magnetic coring 200 to be magnetically levitated.

The radial magnetic bearing 300 and the thrust magnetic bearing 500 are a hybrid magnetic bearing including a permanent magnet 430 and an electromagnet.

The radial magnetic bearing 300 and the thrust magnetic bearing 500 are conventional prior arts and thus, specific explanations on those will be omitted.

Here, the radial bearing 300 may be disposed such that a gap may be formed between an inner circumference of the radial bearing 300 and an outer circumference of the magnetic coring 200 at both end portions of the protrusion 110.

In addition, a thrust collar 510 may be integrally combined at an end portion of the protrusion 110, and the thrust magnetic bearing 500 may be disposed around the thrust collar 510.

The gap sensor 600 may include a radial sensor 610 disposed over the roller 100, and an axial sensor 620 disposed at an end portion of the roller 100.

The radial sensor 610 is spaced apart from an upper portion of the roller 100 by a predetermined distance and is fixed to outside. Here, the radial sensor 610 may sense an up and down shaking of the roller 100 when the roller 100 drives.

The axial sensor 620 is spaced apart from an end portion of the thrust bearing by a predetermined distance and is fixed to outside. Here, the axial sensor 620 heads for an axial direction of the roller 100 and may sense an axial shaking of the roller 100.

Figure 3:
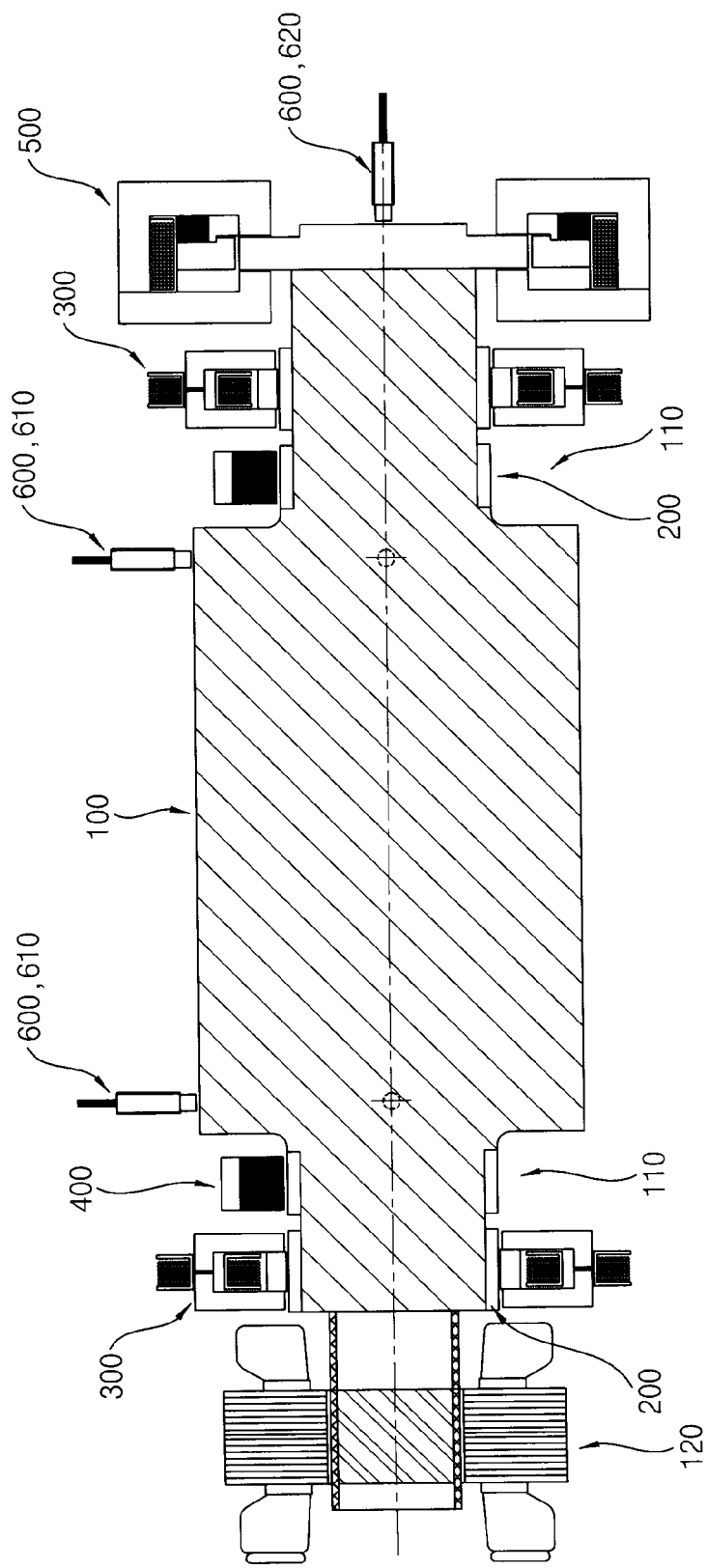
FIG. 3 is a cross-sectional view illustrating the roller module of FIG. 2 having a roller driving motor.

FIG. 3 is a cross-sectional view illustrating the roller module of FIG. 2 having a roller driving motor.

Referring to FIG. 3, the roller driving motor 120 may be additionally disposed at a side of the roller 100.

Thus, the roller 100, when used at the manufacturing equipment for printing or producing graphene, may be an idle roller without any driving, but the roller 100, as the roller driving motor 120 is additionally included, may be used as a driving roller transferring a substrate.

Figure 4:
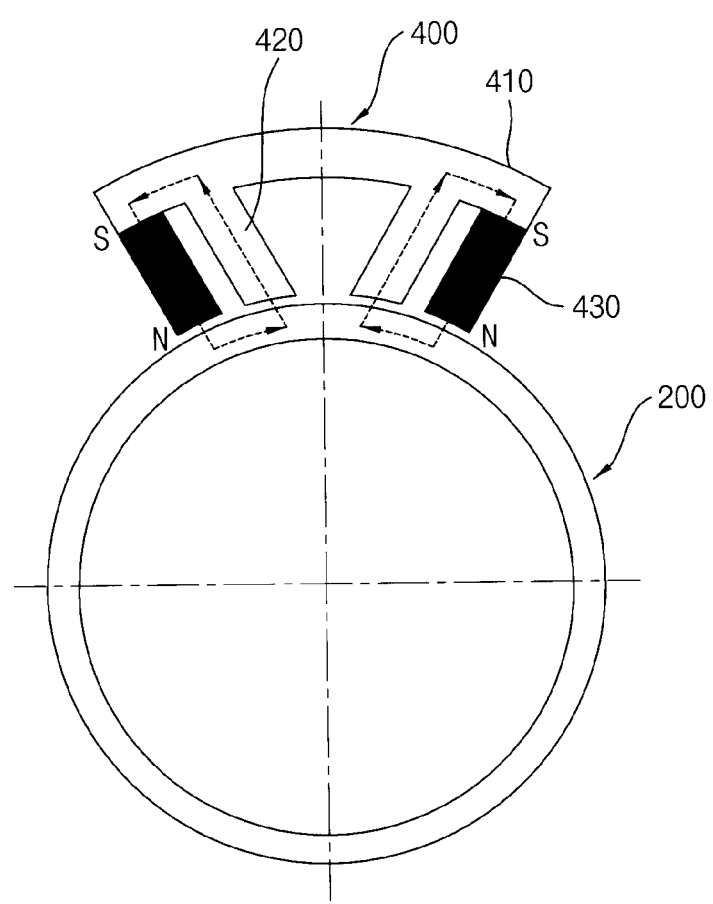
FIG. 4 is a front view illustrating a permanent magnet part of the roller module of FIG. 2.
Figure 5:
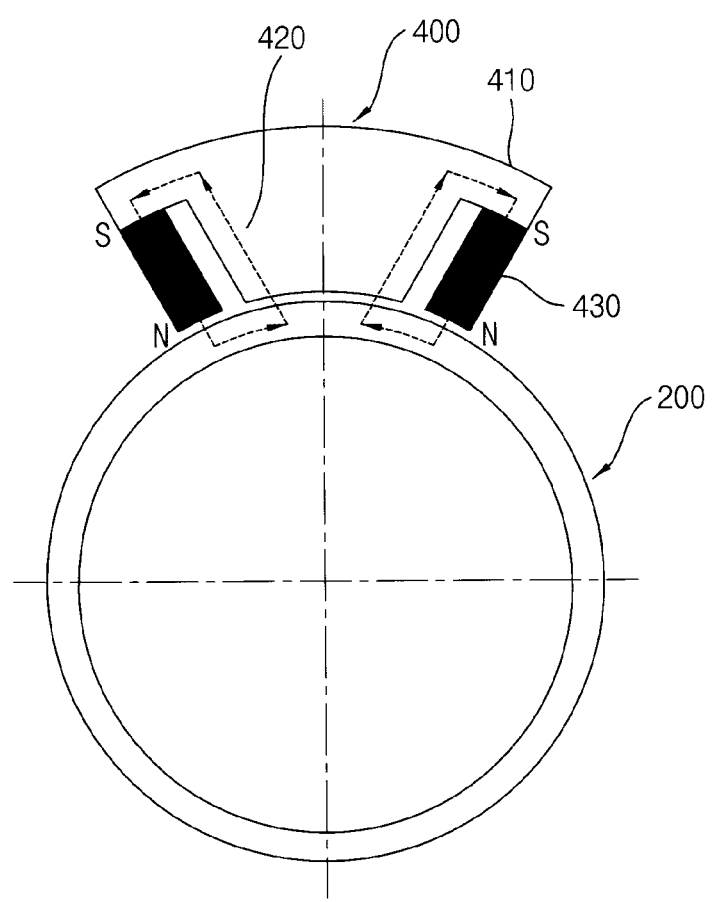
FIG. 5 is a front view illustrating a permanent magnet part of the roller module according to another example embodiment of the present invention.
Figure 6:
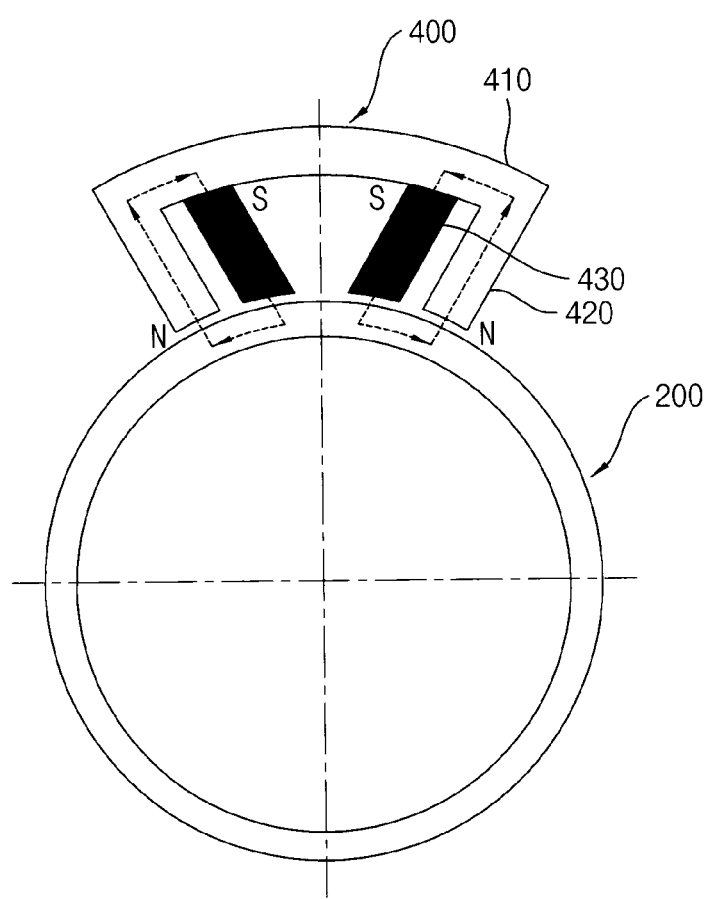
FIG. 6 is a front view illustrating a permanent magnet part of the roller module according to still another example embodiment of the present invention.
Figure 7:
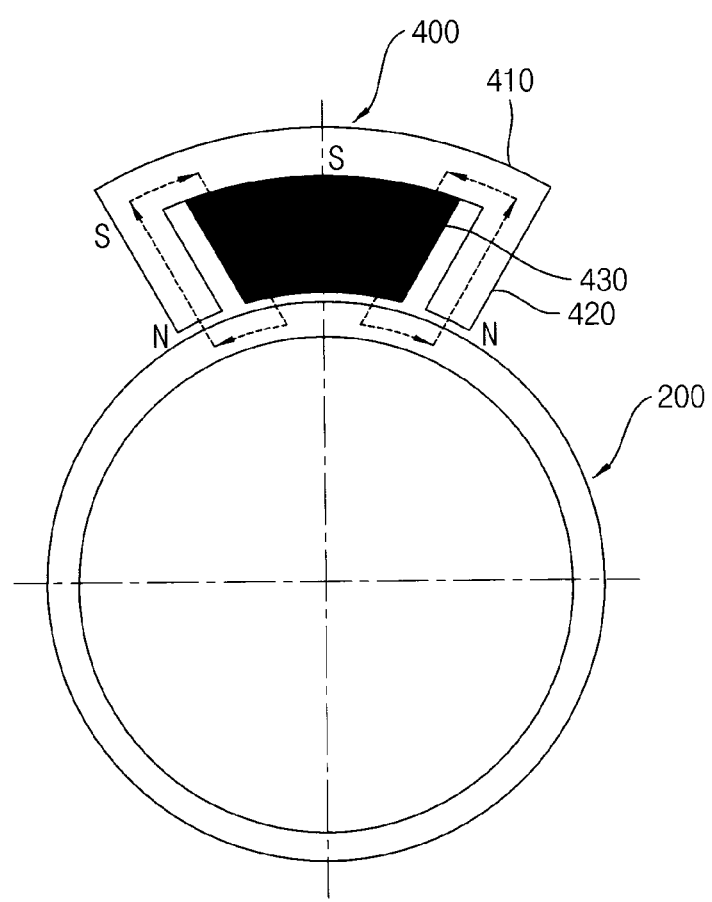
FIG. 7 is a front view illustrating a permanent magnet part of the roller module according to still another example embodiment of the present invention.

FIG. 4 is a front view illustrating a permanent magnet part of the roller module of FIG. 2. FIG. 5 is a front view illustrating a permanent magnet part of the roller module according to another example embodiment of the present invention. FIG. 6 is a front view illustrating a permanent magnet part of the roller module according to still another example embodiment of the present invention. FIG. 7 is a front view illustrating a permanent magnet part of the roller module according to still another example embodiment of the present invention.

Referring to FIG. 4, the permanent magnet part 400 may include a first conductor 410 spaced apart from the outer circumference of the magnetic coring 200 in parallel and having an arc shape; a single or a plurality of second conductors 420 disposed beneath the first conductor 410 and heading for the magnetic coring 200; and a single or a plurality of permanent magnetics 430 disposed beneath the first conductor 410 and adjacent to an inner side or an outer side of the second conductor 420.

Same poles of the permanent magnet 430 face the magnetic coring 200.

In the present example embodiment, the permanent magnet 430 is disposed at both outer sides of the permanent magnet part 400, and the first and second conductors 410 and 420 having magnetism are respectively disposed at inner and upper sides of the permanent magnet part 400.

In addition, the permanent magnet part 400 may have non-contacting combination with the magnetic coring 200 at a lower portion thereof, to form a magnetic pathway.

In addition, both poles of the permanent magnet 430 facing the magnetic coring 200 may be same as N poles or S poles.

In addition, the permanent magnet 430 may have the magnetic pathway in a series of the magnetic coring 200, the second conductor 420, the first conductor 410 and the permanent magnet 430.

Thus, in the permanent magnet part 400, a magnetic force to attract the magnetic coring 200 may be generated from the permanent magnet 430 disposed at both sides of the permanent magnet part 400.

Referring to FIG. 5, in the permanent magnet part 400 according to the present example embodiment, the second conductor 420 integrally extends heading for the magnetic coring 200 from the first conductor 410, instead of the second conductor 420 being separated and extending heading for the magnetic coring 200 from the first conductor 410 in the permanent magnet part 400 in FIG. 4.

Here, the permanent magnet 430 may have the magnetic pathway in a series of the magnetic coring 200, the second conductor 420, the first conductor 410 and the permanent magnet 430. Thus, in the permanent magnet part 400, a magnetic force to attract the magnetic coring 200 may be generated from the permanent magnet 430 disposed at both sides of the permanent magnet part 400.

Referring to FIG. 6, in the permanent magnet part 400 according to the present example embodiment, the second conductor 420 is disposed beneath both end portions of the first conductor 410, and two permanent magnets 430 are disposed inside of the second conductor 420.

In addition, both poles of the permanent magnet 430 facing the magnetic coring 200 may be same as N poles or S poles. 200

In addition, the permanent magnet part 400 may have non-contacting combination with the magnetic coring 200 at a lower portion thereof, to form a magnetic pathway.

In addition, the permanent magnet 430 may have the magnetic pathway in a series of the magnetic coring 200, the second conductor 420, the first conductor 410 and the permanent magnet 430.

Thus, in the permanent magnet part 400, a magnetic force to attract the magnetic coring 200 may be generated from the permanent magnet 430 disposed at both sides of the permanent magnet part 400.

Referring to FIG. 7, in the permanent magnet part 400 according to the present example embodiment, the second conductor 420 is disposed beneath both end portions of the first conductor 410, and a single permanent magnet 430 is disposed inside of the second conductor 420.

In addition, both poles of the permanent magnet 430 facing the magnetic coring 200 may be same as N poles or S poles. 200

In addition, the permanent magnet part 400 may have non-contacting combination with the magnetic coring 200 at a lower portion thereof, to form a magnetic pathway.

In addition, the permanent magnet 430 may have the magnetic pathway in a series of the magnetic coring 200, the second conductor 420, the first conductor 410 and the permanent magnet 430.

Thus, in the permanent magnet part 400, a magnetic force to attract the magnetic coring 200 may be generated from the permanent magnet 430 disposed at both sides of the permanent magnet part 400.

Figure 8A:
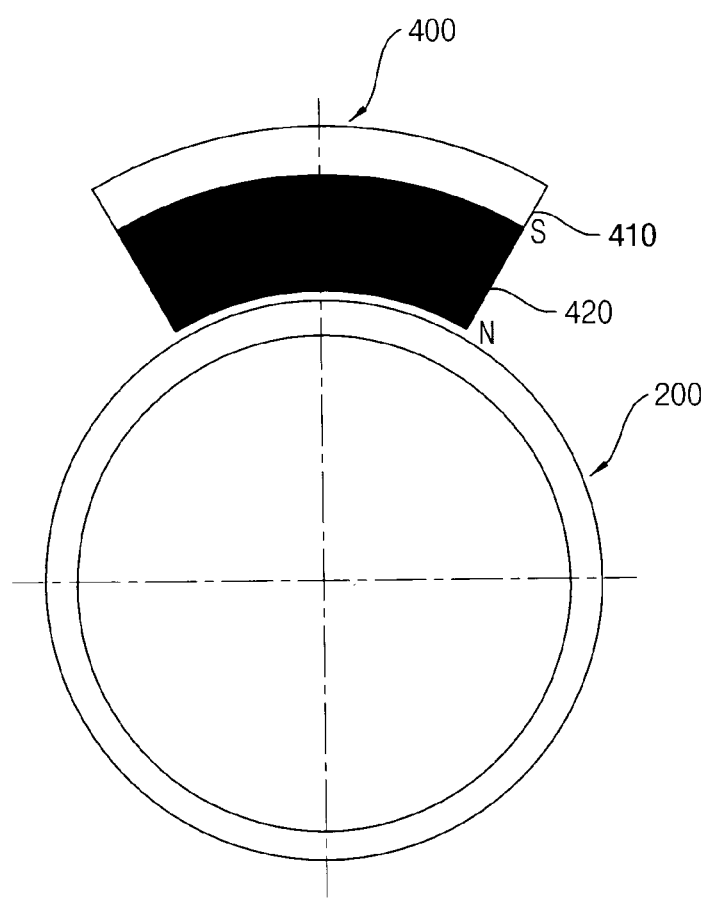
FIG. 8A is a front view illustrating a permanent magnet part of the roller module according to still another example embodiment of the present invention.
Figure 8B:
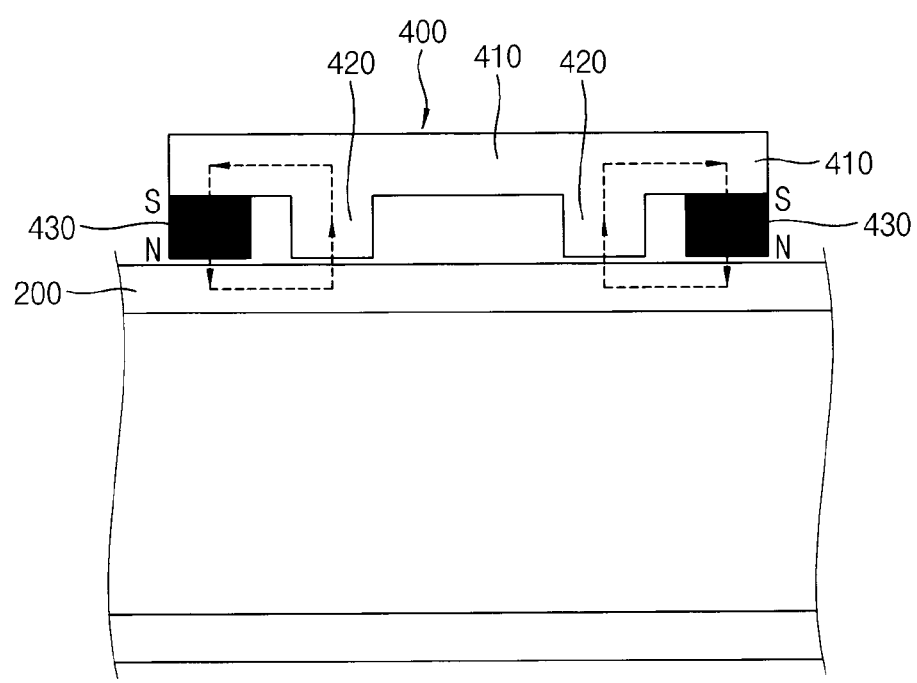
FIG. 8B is a side view illustrating an example of the permanent magnet part of FIG. 8A.

FIG. 8A is a front view illustrating a permanent magnet of the roller module according to still another example embodiment of the present invention, and FIG. 8B is a side view illustrating an example of the permanent magnet of FIG. 8A.

Referring to FIGS. 8A and 8B, in the permanent magnet part 400 according to the present example embodiment, the permanent magnet 430 is disposed beneath the first conductor 410, and the permanent magnet part 400 extends along an axial direction of the magnetic coring 200 as illustrated in the figure.

As illustrated in FIG. 8B, the first conductor 410 extends along the axial direction of the magnetic coring 200. The permanent magnet 430 is protruded toward the magnetic coring 200 at both end portions of the first conductor 410 along the axial direction of the magnetic coring 200. In addition, the second conductor 420 is disposed inside of the permanent magnet 430 and extends toward the magnetic coring 200 from the first conductor 410.

In addition, as illustrated in FIG. 8A, the first conductor 410, the second conductor 420 and the permanent magnet 430 extend along a circumferential direction of the magnetic coring 200 by a predetermined arc distance.

Thus, in the permanent magnet part 400 according to the present example embodiment, the magnetic pathway is generated in a series of the magnetic coring 200, the permanent magnet 430, the second conductor 420 and the first conductor 410. In addition, the magnetic pathway is generated at both end portions of the permanent magnet part 400 with the same pathway.

Accordingly, in the permanent magnet part 400, a magnetic force to attract the magnetic coring 200 may be generated from the permanent magnet 430.

Although two pairs of second conductor 420 and permanent magnet 430 are illustrated in the figure, a pair of second conductor 420 and permanent magnet 430 may be disposed.

Figure 8C:
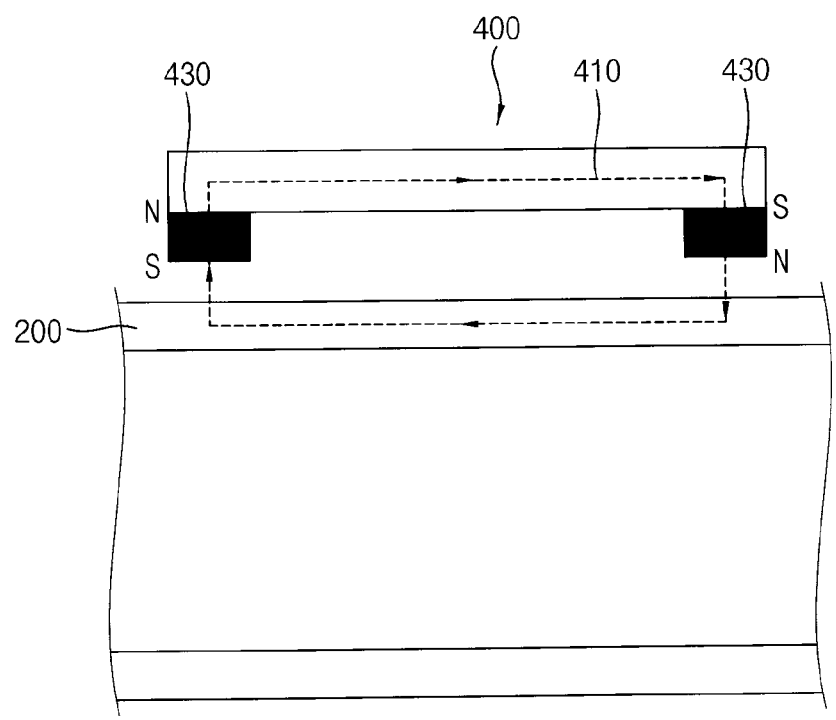
FIG. 8C is a side view illustrating another example of the permanent magnet part of FIG. 8A.

FIG. 8C is a side view illustrating another example of the permanent magnet of FIG. 8A.

As illustrated in FIG. 8C, the first conductor 410 extends along the axial direction of the magnetic coring 200, and the permanent magnet 430 is protruded toward the magnetic coring 200 at both end portions of the first conductor 410 along the axial direction of the magnetic coring 200.

In addition, as illustrated in FIG. 8A, the first conductor 410 and the permanent magnet 430 extend along a circumferential direction of the magnetic coring 200 by a predetermined arc distance.

Accordingly, in the permanent magnet part 400 according to the present example embodiment, the magnetic pathway is generated in a series of the magnetic coring 200, the permanent magnet 430 and the first conductor 410. In addition, the magnetic pathway is generated from a first end of the permanent magnet part 400 to a second end thereof, as illustrated in the figure.

Thus, in the permanent magnet part 400, a magnetic force to attract the magnetic coring 200 may be generated from the permanent magnet 430.

In the above mentioned example embodiments, in the permanent magnet part 400, a magnetic force to attract the magnetic coring 200 may be generated from the permanent magnet 430 in common, and thus a self-load of the roller 100 may be supported with no current applied to the roller 100.

A proper example embodiment may be selected considering usability in manufacturing the permanent magnet and the conductors based on a diameter of the roller, a quantity of the magnetic force generated from the permanent magnet, and so on.

Figure 9:
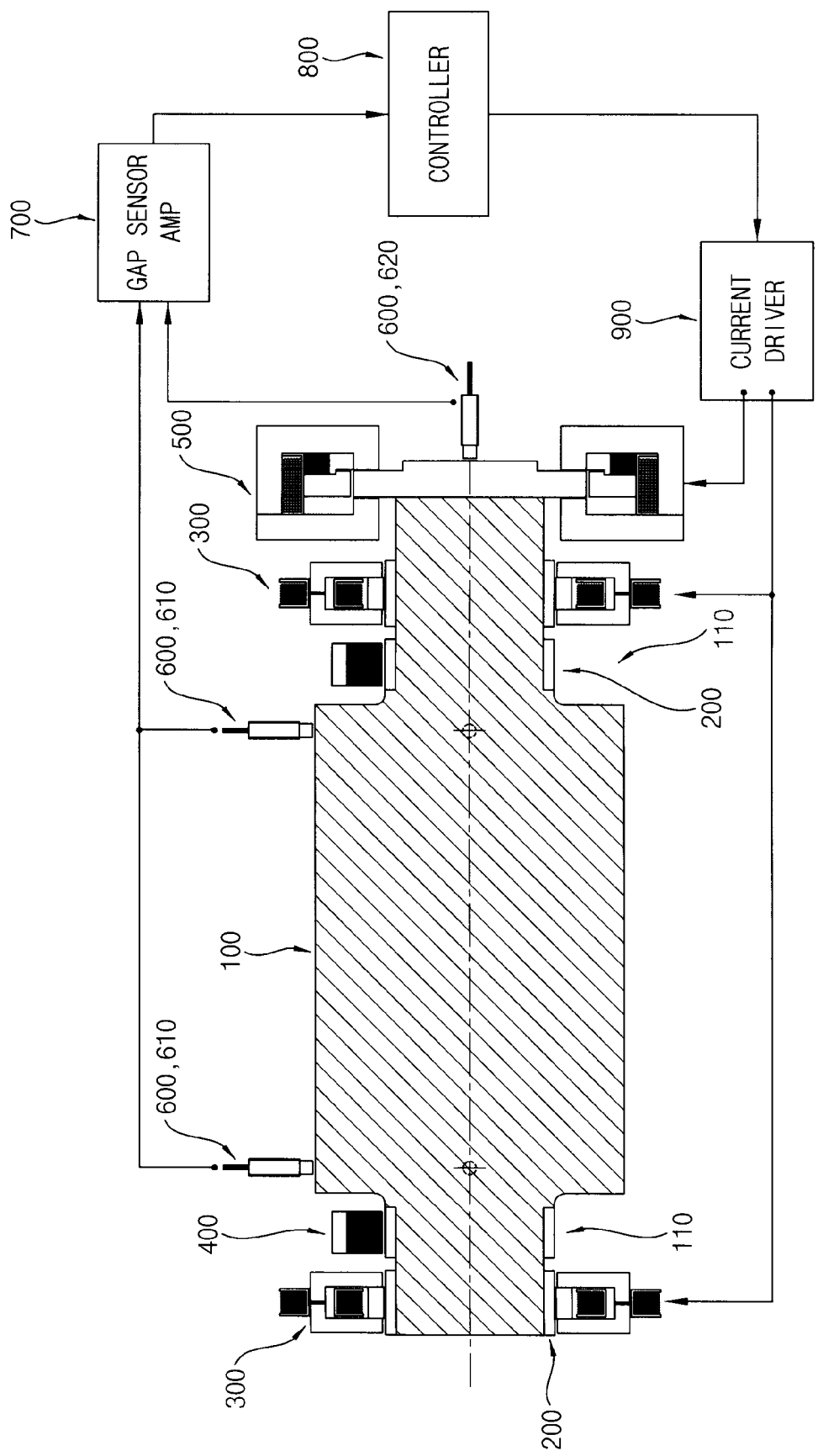
FIG. 9 is a driving schematic diagram illustrating the roller module of FIG. 2.

FIG. 9 is a driving schematic diagram illustrating the roller module of FIG. 2.

Referring to FIG. 9, the roller module having the magnetic bearing and the permanent magnet further includes a gap sensor amp 700 connected to the gap sensor 600; a controller 800 connected to the gap sensor amp 700; and a current driver 900 providing a driving current calculated in the controller to the radial magnetic bearing 300 and the thrust magnetic bearing 500.

More specifically, the gap sensor 600 detects a distance gap with the roller 100, and a signal from the gap sensor 600 outputs as a voltage through the gap sensor amp 700.

Here, the gap sensor amp 700 is separated from the gap sensor 600 and is disposed outside.

In addition, the controller 800 receives a displacement feedback from the gap sensor amp 700 and calculates a driving current of the radial magnetic bearing 300 and the thrust magnetic bearing 500.

In addition, the radial magnetic bearing 300 and the thrust magnetic bearing 500 provides the calculated current through a current driver 900, to minimize a vibration or a shaking of the roller 100.

In the present example embodiment, the roller module includes the radial magnetic bearing 300 and the thrust magnetic bearing 500 respectively along the radial direction and the axial direction, and includes the permanent magnet part 400 in addition over the roller 100, to support loads along the radial and axial directions and to support a self-load of the roller 100 during no current applied, such that the shaking error of the roller 100 may be minimized.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Having described the example embodiments of the present invention and its advantage, it is noted that various changes, substitutions and alterations can be made herein without departing from the spirit and scope of the invention as defined by appended claims.

REFERENCE NUMERALS

100: roller
110: protrusion
200: magnetic coring
300: radial magnetic bearing
400: permanent magnet part
500: thrust magnetic bearing
600: gap sensor
610: radial sensor
620: axial sensor
410: first conductor
420: second conductor
430: permanent magnet
510: thrush collar
700: gap sensor amp
800: controller
900: current driver

What is claimed is:

1. A roller module, comprising:
a roller having a protrusion and having a cylindrical shape, the protrusion being formed at both outer surfaces of the roller with a stepped portion and having the cylindrical shape;
a magnetic bearing formed at the roller;
a permanent magnet part formed at the roller and comprising a first conductor;
at least one pair of magnetic coring covering an outer circumference of the protrusion; and
a plurality of gap sensors formed along an axial direction and a radial direction of the roller,
wherein the magnetic bearing comprises a radial magnetic bearing and a thrust magnetic bearing, the radial magnetic bearing is formed at an outer circumference of an end portion of the magnetic coring to support a radial load of the roller, and the thrust magnetic bearing is formed at an end portion of the protrusion to support an axial load of the roller,
wherein the permanent magnet part is adjacent to the outer circumference of the magnetic coring in the radial direction, and adjacent to the radial magnetic bearing along the axial direction,
wherein the first conductor is spaced apart from the outer circumference of the magnetic coring in the radial direction, and the first conductor extends along and in parallel with the axial direction of the magnetic coring,
wherein the permanent magnet part further comprises
at least one second conductor disposed beneath the first conductor and protruding toward the magnetic coring, and
at least one permanent magnet,
wherein a magnetic pathway is generated in a series through the magnetic coring, the at least one permanent magnet, the first conductor, and the at least one second conductor, and wherein same poles for an entirety of the plurality of permanent magnets face the magnetic coring.

2. The roller module of claim 1, wherein each of the radial magnetic bearing and the thrust magnetic bearing is a hybrid magnetic bearing further comprising an electromagnet in addition to the at least one permanent magnet.

3. The roller module of claim 1, wherein the plurality of gap sensors comprises:
a radial sensor formed over the roller; and
an axial sensor formed at an end portion of the roller.

4. The roller module of claim 1, wherein
the at least one permanent magnet comprises a plurality of permanent magnets disposed beneath the first conductor and adjacent to an inner side or an outer side of the at least one second conductor, and
the first conductor has an arc shape.

5. The roller module of claim 1, wherein
the at least one permanent magnet comprises a plurality of permanent magnets extending to the magnetic coring from both end portions of the first conductor.

6. The roller module of claim 1, further comprising:
a gap sensor amp connected to the plurality of gap sensors;
a controller connected to the gap sensor amp; and
a current driver providing a driving current calculated in the controller to the radial magnetic bearing and the thrust magnetic bearing.

7. The roller module of claim 1, wherein
the at least one second conductor is a single second conductor disposed beneath the first conductor and extending towards the magnetic coring,
the at least one permanent magnet is a single permanent magnet disposed beneath the first conductor and adjacent to an inner side or an outer side of the single second conductor, and
the first conductor has an arc shape.

8. The roller module of claim 1, wherein the at least one second conductor is spaced apart from the at least one permanent magnet.

9. The roller module of claim 8, wherein the first conductor and the at least one second conductor have magnetism.

* * * * *